US012604919B2

(12) United States Patent
 Castagnetti

(10) Patent No.: US 12,604,919 B2
(45) Date of Patent: Apr. 21, 2026

(54) ALTERNATIVE DAIRY

(71) Applicant: FAIRFLAVOR FOODS LIMITED, Hong Kong (CN)

(72) Inventor: Gabriele Castagnetti, North Jakarta (ID)

(73) Assignee: FAIRFLAVOR FOODS LIMITED, Kowloon (HK)

(*) Notice: Subject to any disclaimer, the term of this patent is extended or adjusted under 35 U.S.C. 154(b) by 257 days.

(21) Appl. No.: 18/293,161

(22) PCT Filed: Jul. 27, 2022

(86) PCT No.: PCT/CN2022/108102
§ 371 (c)(1),
(2) Date: Jan. 29, 2024

(87) PCT Pub. No.: WO2023/005956
PCT Pub. Date: Feb. 2, 2023

(65) Prior Publication Data
US 2024/0373889 A1 Nov. 14, 2024

Related U.S. Application Data

(60) Provisional application No. 63/226,399, filed on Jul. 28, 2021.

(51) Int. Cl.
A23L 25/00 (2016.01)
A23C 20/02 (2025.01)
(Continued)

(52) U.S. Cl.
CPC .............. A23L 25/40 (2016.08); A23C 20/02 (2013.01); A23G 9/363 (2013.01); A23G 9/42 (2013.01);
(Continued)

(58) Field of Classification Search
CPC . A23L 25/40; A23L 5/276; A23L 5/49; A23L 7/104; A23L 11/30; A23L 25/00;
(Continued)

(56) References Cited

U.S. PATENT DOCUMENTS

2007/0026128 A1* 2/2007 Jarrett .................... A23L 33/40
426/628
2020/0352202 A1 11/2020 Johnson et al.

FOREIGN PATENT DOCUMENTS

CN 101472491 A 7/2009
CN 113163797 A 7/2021
(Continued)

OTHER PUBLICATIONS

International Search Report and Written Opinion dated Oct. 8, 2022 for Intl. Pat. No. PCT/CN2022/108102.
(Continued)

*Primary Examiner* — Emily M Le
*Assistant Examiner* — Carrie Glimm
(74) *Attorney, Agent, or Firm* — Husch Blackwell LLP

(57) ABSTRACT

A method to prepare a food composition includes providing a nut from *Canarium* or a nut from *Cyperus esculentus*; removing a flavor from the nut; providing an enzyme; and mixing the nut with the enzyme for an enzymatic reaction to form the food composition, wherein the food composition does not contain animal milk. The method may further include providing a cultivating material and mixing the nut with the cultivating material for a microbial fermentation, providing a whitening agent and mixing the nut with the whitening agent, or providing a baking soda and mixing the nut with the baking soda. The food composition may include a substitute for cheese, dessert, or ice cream.

7 Claims, 9 Drawing Sheets

(51) Int. Cl.
    *A23G 9/36*     (2006.01)
    *A23G 9/42*     (2006.01)
    *A23L 5/20*     (2016.01)
    *A23L 5/49*     (2016.01)
    *A23L 33/16*     (2016.01)

(52) U.S. Cl.
    CPC ................. *A23L 5/276* (2016.08); *A23L 5/49*
    (2016.08); *A23L 33/16* (2016.08)

(58) Field of Classification Search
    CPC .......... A23C 20/02; A23G 9/363; A23G 9/42;
    A23G 9/36
    See application file for complete search history.

(56)                          References Cited

FOREIGN PATENT DOCUMENTS

| | | | |
|---|---|---|---|
| EP | 3272228 A1 | 1/2018 | |
| KR | 20200101169 A | 8/2020 | |
| WO | WO-2020127358 A1 * | 6/2020 | ............... A23L 2/66 |

OTHER PUBLICATIONS

Machine Translation of KR20200101169.
Machine Translation of CN101472491.
Machine Translation of CN113163797.

\* cited by examiner

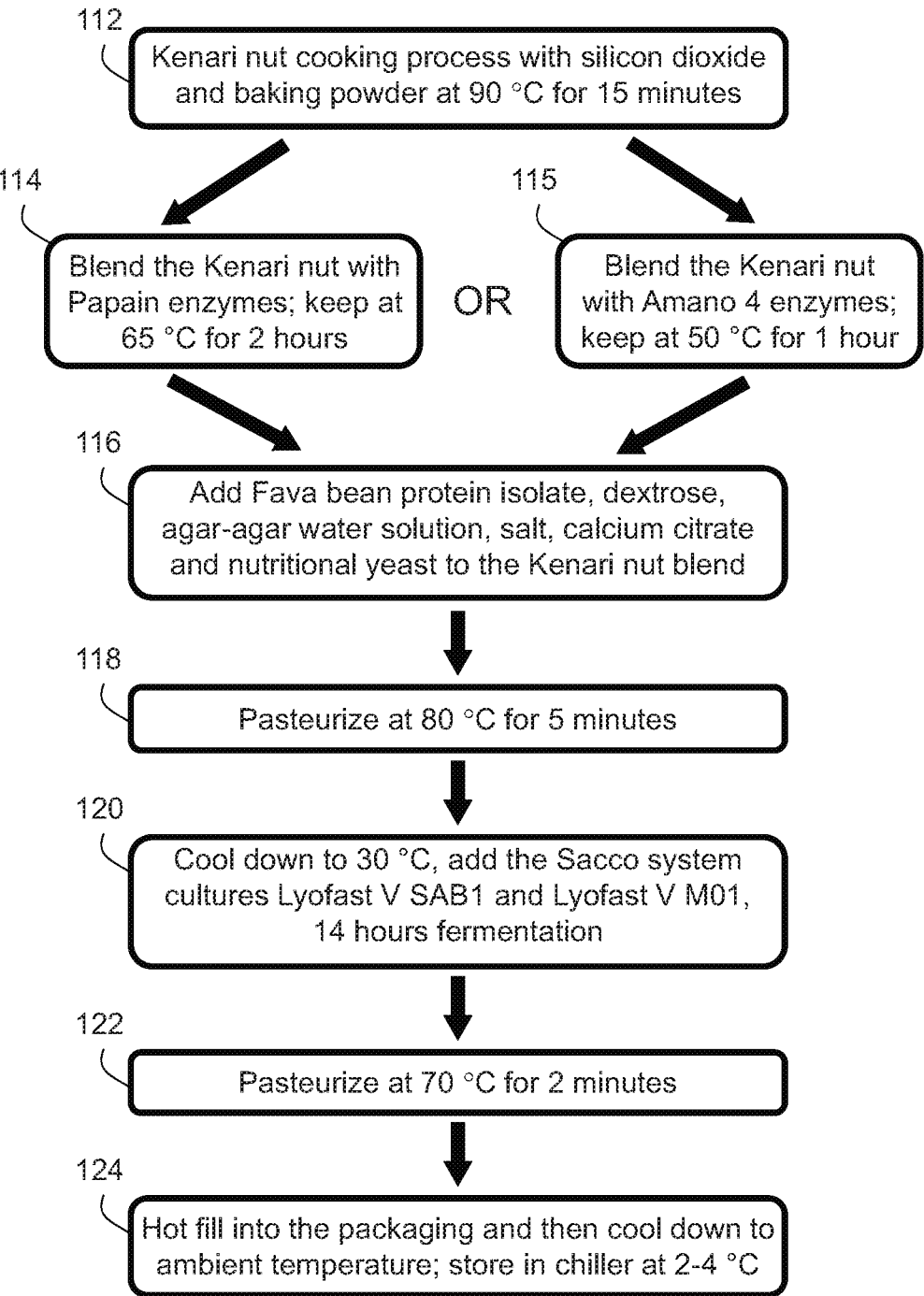

112

Kenari nut cooking process with silicon dioxide
and baking powder at 90 °C for 15 minutes

114

Blend the Kenari nut with
Papain enzymes; keep at
65 °C for 2 hours

OR

115

Blend the Kenari nut
with Amano 4 enzymes;
keep at 50 °C for 1 hour

116

Add Fava bean protein isolate, dextrose,
agar-agar water solution, salt, calcium citrate
and nutritional yeast to the Kenari nut blend

118

Pasteurize at 80 °C for 5 minutes

120

Cool down to 30 °C, add the Sacco system
cultures Lyofast V SAB1 and Lyofast V M01,
14 hours fermentation

122

Pasteurize at 70 °C for 2 minutes

124

Hot fill into the packaging and then cool down to
ambient temperature; store in chiller at 2-4 °C

FIG. 1B

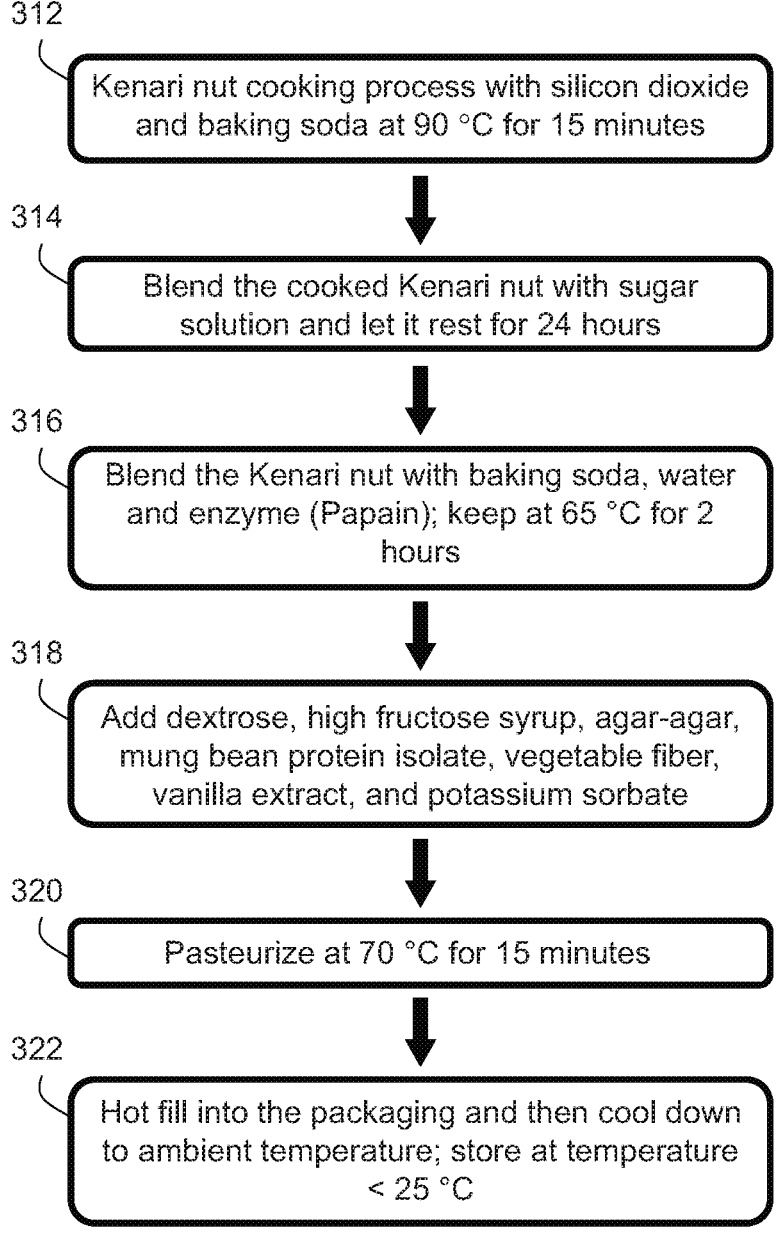

312

Kenari nut cooking process with silicon dioxide and baking soda at 90 °C for 15 minutes

314

Blend the cooked Kenari nut with sugar solution and let it rest for 24 hours

316

Blend the Kenari nut with baking soda, water and enzyme (Papain); keep at 65 °C for 2 hours

318

Add dextrose, high fructose syrup, agar-agar, mung bean protein isolate, vegetable fiber, vanilla extract, and potassium sorbate

320

Pasteurize at 70 °C for 15 minutes

322

Hot fill into the packaging and then cool down to ambient temperature; store at temperature < 25 °C

FIG. 3B

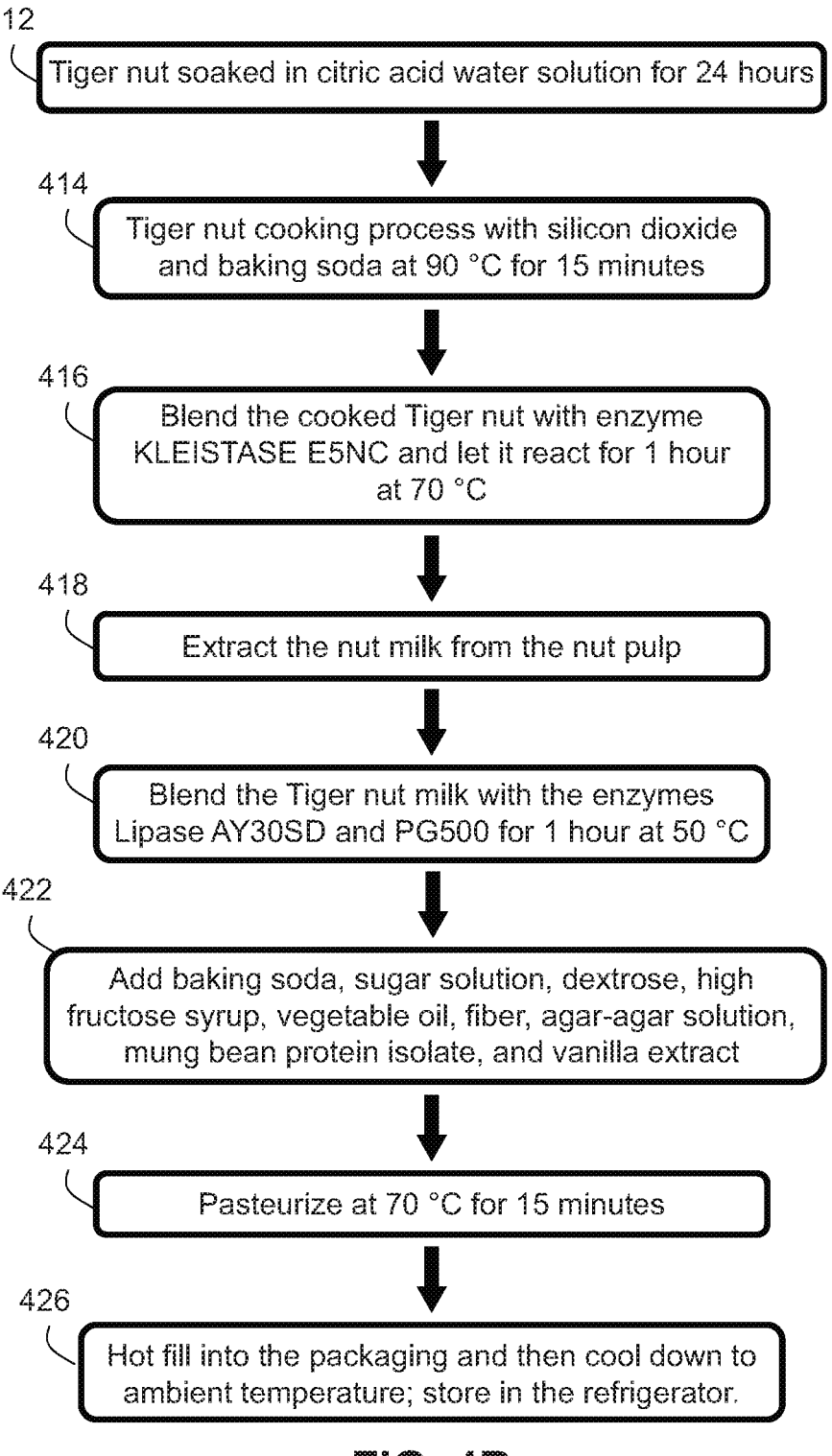

412

Tiger nut soaked in citric acid water solution for 24 hours

414

Tiger nut cooking process with silicon dioxide and baking soda at 90 °C for 15 minutes

416

Blend the cooked Tiger nut with enzyme KLEISTASE E5NC and let it react for 1 hour at 70 °C

418

Extract the nut milk from the nut pulp

420

Blend the Tiger nut milk with the enzymes Lipase AY30SD and PG500 for 1 hour at 50 °C

422

Add baking soda, sugar solution, dextrose, high fructose syrup, vegetable oil, fiber, agar-agar solution, mung bean protein isolate, and vanilla extract

424

Pasteurize at 70 °C for 15 minutes

426

Hot fill into the packaging and then cool down to ambient temperature; store in the refrigerator.

FIG. 4B

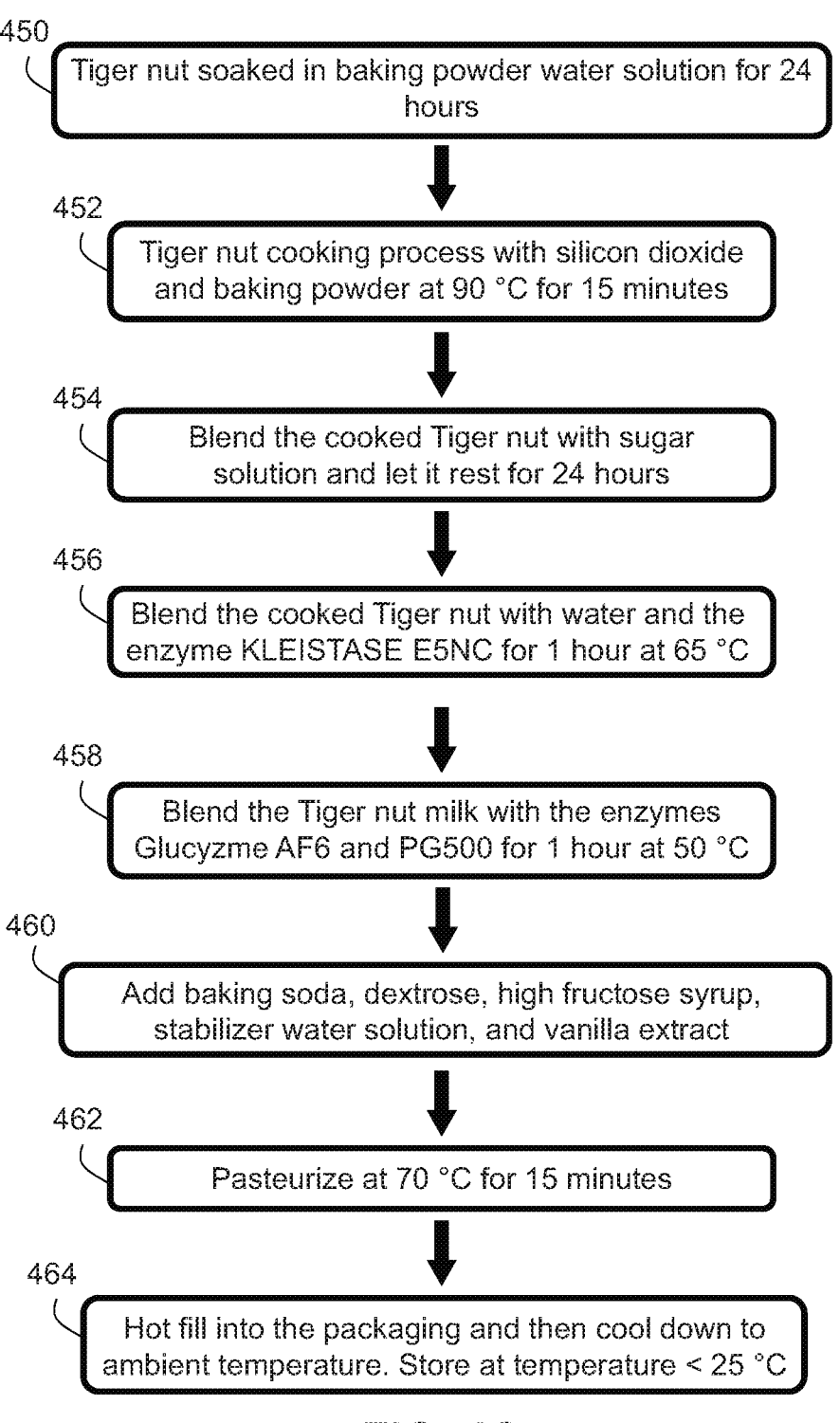

450 Tiger nut soaked in baking powder water solution for 24 hours

452 Tiger nut cooking process with silicon dioxide and baking powder at 90 °C for 15 minutes 454 Blend the cooked Tiger nut with sugar solution and let it rest for 24 hours 456 Blend the cooked Tiger nut with water and the enzyme KLEISTASE E5NC for 1 hour at 65 °C 458 Blend the Tiger nut milk with the enzymes Glucyzme AF6 and PG500 for 1 hour at 50 °C 460 Add baking soda, dextrose, high fructose syrup, stabilizer water solution, and vanilla extract 462 Pasteurize at 70 °C for 15 minutes 464 Hot fill into the packaging and then cool down to ambient temperature. Store at temperature < 25 °C

FIG. 4C

ALTERNATIVE DAIRY

CROSS REFERENCES

The application is a U.S. National Phase Application of International Application No. PCT/CN2022/108102 filed on Jul. 27, 2022, which claims priority to U.S. Provisional Application No. 63,226,399, filed on Jul. 28, 2021, the disclosures of each of which are hereby incorporated herein by reference in their entireties.

TECHNICAL FIELD

The present teachings relate generally to a method of food production, and more specifically to a method of using nuts for producing a dairy-alternative or dairy-substitute food composition.

BACKGROUND

Dairy-based food items are extremely popular around the world. People can enjoy the rich texture and flavor of these products at any time of day and in any social setting. However, humans naturally develop an intolerance for dairy as they age, as well as people with certain genetic or medical conditions.

In the past, attempts to remedy this issue generally include taking pills prior to ingesting dairy products, which counteract some of the effects of the intolerance. However, it is not always feasible or desirable to carry special medication for consuming dairy products.

Other notable attempts to remedy the issue generally include the use of substitute ingredients in place of dairy. However, these substitutes often fail to recreate the distinct texture and flavor of the dairy products and may be undesirable to consumers.

Therefore, it would be beneficial to have an alternative method to produce dairy food-like products without the use of dairy. It may be desirable for people to consume the dairy food-like products without the use of dairy and enjoy the flavor and texture of dairy-based food items without experiencing discomfort or having to take medication.

SUMMARY

The needs set forth herein as well as further and other needs and advantages are addressed by the present embodiments, which illustrate solutions and advantages described below.

It is an object of the present teachings to provide a method for processing nuts from *Canarium* species to produce food products, specifically dairy alternative food products which do not contain animal milk, such as cream cheese, dessert, and ice cream.

It is another object of the present teachings to provide a method for processing nuts from *Cyperius esculantus* species to produce food products, specifically dairy alternative food products which do not contain animal milk, such as ice cream.

These and other objects of the present teachings are achieved by a method to prepare a food composition, which comprises providing a nut from *Canarium*; removing a flavor from the nut; providing an enzyme; mixing the nut with the enzyme for an enzymatic reaction; providing a cultivating material; and mixing the nut with the cultivating material for a microbial fermentation to form the food composition, wherein the food composition does not contain animal milk. The food composition comprises a substitute for cheese. Removing the flavor from the nut comprises providing and mixing water and silicon dioxide to form a first mixture; heating the first mixture; mixing the first mixture with the nut to form a second mixture; heating the second mixture; providing baking powder; mixing the baking powder with the second mixture to form a third mixture; heating the third mixture; and separating the nut from the third mixture. Heating the third mixture further comprises heating the third mixture at 90° C. for 15 minutes. The enzyme may comprise papain, and the method may further comprise keeping the nut mixed with the enzyme at 65° C. for 2 hours for the enzymatic reaction. In other embodiments, the enzyme may comprises thermoase PC10F, lipase AY30SD, and PG500, and the method may further comprise keeping the nut mixed with the enzyme at 50° C. for 1 hour for the enzymatic reaction. The cultivating material comprises lyofast V SAB1 and lyofast V M01, and the method further comprises keeping the nut mixed with the cultivating material at 36° C. for at least 7 hours for the microbial fermentation.

The present teachings also provide a method to prepare a food composition, which comprises providing a nut from *Canarium*; removing a flavor from the nut; providing an enzyme; and mixing the nut with the enzyme for an enzymatic reaction to form the food composition, wherein the food composition does not contain animal milk. The food composition comprises a substitute for dessert. Removing the flavor from the nut comprises providing and mixing water and silicon dioxide to form a first mixture; heating the first mixture; mixing the first mixture with the nut to form a second mixture; heating the second mixture; providing baking soda; mixing the baking soda with the second mixture to form a third mixture; heating the third mixture; and separating the nut from the third mixture. Heating the third mixture further comprises heating the third mixture at 90° C. for 15 minutes. The enzyme may comprise papain, and the method may further comprise keeping the nut mixed with the enzyme at 65° C. for 2 hours for the enzymatic reaction. In other embodiments, the enzyme may comprise thermoase PC10F, lipase AY30SD, and PG500, and the method may further comprise keeping the nut mixed with the enzyme at 50° C. for 1 hour for the enzymatic reaction.

The present teachings also provide a method to prepare a food composition, which comprises providing a nut from *Canarium*; removing a flavor from the nut; providing a whitening agent; mixing the nut with the whitening agent; providing an enzyme; mixing the nut with the enzyme for an enzymatic reaction; providing a texture-improving agent; and mixing the nut with the texture-improving agent to form the food composition, wherein the food composition does not contain animal milk. The food composition comprises a substitute for ice cream. Removing the flavor from the nut comprises providing and mixing water and silicon dioxide to form a first mixture; heating the first mixture; mixing the first mixture with the nut to form a second mixture; heating the second mixture; providing baking soda; mixing the baking soda with the second mixture to form a third mixture; heating the third mixture; and separating the nut from the third mixture. Heating the third mixture further comprises heating the third mixture at 90° C. for 15 minutes. The whitening agent comprises a sugar solution, and the method further comprises resting the nut mixed with the whitening agent for 24 hours. The enzyme may comprise papain, and the method may further comprise keeping the nut mixed with the enzyme at 65° C. for 2 hours for the enzymatic reaction. In other embodiments, the enzyme may comprise thermoase PC10F, lipase AY30SD, and PG500, and the method may further comprise keeping the nut mixed with the enzyme at 50° C. for 1 hour for the enzymatic reaction. The texture-improving agent comprises baking soda, and the method further comprises keeping the nut mixed with texture-improving agent at a temperature same as the enzymatic reaction and with a duration same as the enzymatic reaction.

The present teachings also provide a method to prepare a food composition, which comprises providing a nut from *Cyperus esculentus*; removing a flavor from the nut; providing an enzyme; mixing the nut with the enzyme for an enzymatic reaction; providing a baking soda; and mixing the nut with the baking soda to form the food composition, wherein the food composition does not contain animal milk. The food composition comprises a substitute for ice cream. Removing the flavor from the nut comprises providing and mixing water and silicon dioxide to form a first mixture; heating the first mixture; mixing the first mixture with the nut to form a second mixture; heating the second mixture; providing baking powder; mixing the baking powder with the second mixture to form a third mixture; heating the third mixture; and separating the nut from the third mixture. Heating the third mixture further comprises heating the third mixture at 90° C. for 15 minutes. The method further comprises providing a whitening agent and mixing the nut with the whitening agent. The whitening agent comprises a sugar solution, and the method further comprises resting the nut mixed with the whitening agent for 24 hours. The enzyme may comprise Kleistase E5 NC, Gluczyme AF6, and PG500, and the method may further comprise keeping the nut mixed with the Kleistase E5 NC at 65° C. for 1 hour, and thereafter adding the Gluczyme AF6 and the PG500 and keeping the nut mixture (i.e., nut mixed with Kleistase E5 NC, Gluczyme AF6, and PG500) at 50° C. for 1 hour for the enzymatic reaction. In other embodiments, the enzyme may comprise hemicellulase 90, gluczyme AF6, PG500, and lipase AY30SD, and the method may further comprise keeping the nut mixed with the enzyme at 50° C. for 1 hour for the enzymatic reaction. The texture-improving agent comprises baking soda, and the method further comprises keeping the nut mixed with texture-improving agent at a temperature same as the enzymatic reaction and with a duration same as the enzymatic reaction. The method further comprises soaking the nut from *Cyperus esculentus* in a baking powder aqueous solution for 24 hours.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings, which is defined by the claims included herein.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

FIG. 1B is another example of a flow chart illustrating a process for preparing a food composition as a cream cheese alternative by using nuts from *Canarium* species;

FIG. 3B is another example of a flow chart illustrating a process for preparing a food composition as an ice cream alternative by using nuts from *Canarium* species;

FIG. 4B is another example of a flow chart illustrating a process for preparing a food composition as an ice cream alternative by using nuts from *Cyperus esculantus.*

FIG. 4C is another example of a flow chart illustrating a process for preparing a food composition as an ice cream alternative by using nuts from *Cyperus esculantus.*

DETAILED DESCRIPTION

The present teachings are described more fully hereinafter with reference to the accompanying drawings, in which the present embodiments are shown. The following description illustrates the present teachings by way of example, not by way of limitation of the principles of the present teachings.

The present teachings have been described in language more or less specific as to structural features. It is to be understood, however, that the present teachings are not limited to the specific features shown and described, since the product and/or method herein disclosed comprises preferred forms of putting the present teachings into effect.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. Other than in the operating examples, or where otherwise indicated, all numbers expressing quantities of ingredients or reaction conditions used herein are to be understood as modified in all instances by the term "about".

The present teachings provide a method for processing nuts to create substitutes for dairy products. The method includes a flavor removal process to remove the vegetable off-flavor from the nuts and an enzymatic process for the enzymatic reaction. Based on the type of the dairy-substitute product, additional processes may include a microbial fermentation process to add probiotic, a whitening process for whitening the product, and a texture enhancement process for improving the texture of the product. For example, for a cheese-substitute product, the microbial fermentation process may be added. As another example, for an ice cream-substitute product, the whitening process and the texture enhancement process may be added.

The present teachings use nuts from different types of plants to create substitutes for dairy products without animal milk. The nuts may include *Canarium* nuts and tiger nuts. *Canarium* is a genus of tropical and subtropical trees in the family Burseraceae and contains more than 100 species. The *Canarium* species can produce nuts, hereinafter referred to generally as "*Canarium* nut(s)," which may include, for example, Pacific almond, pili nut, Java almond, Kenari nut, galip nut, nangai, and ngali. *Cyperius esculantus* is a species in the family Cyperaceae, and can produce tubers, hereinafter referred to generally as "tiger nut(s)."

Figure 1A:
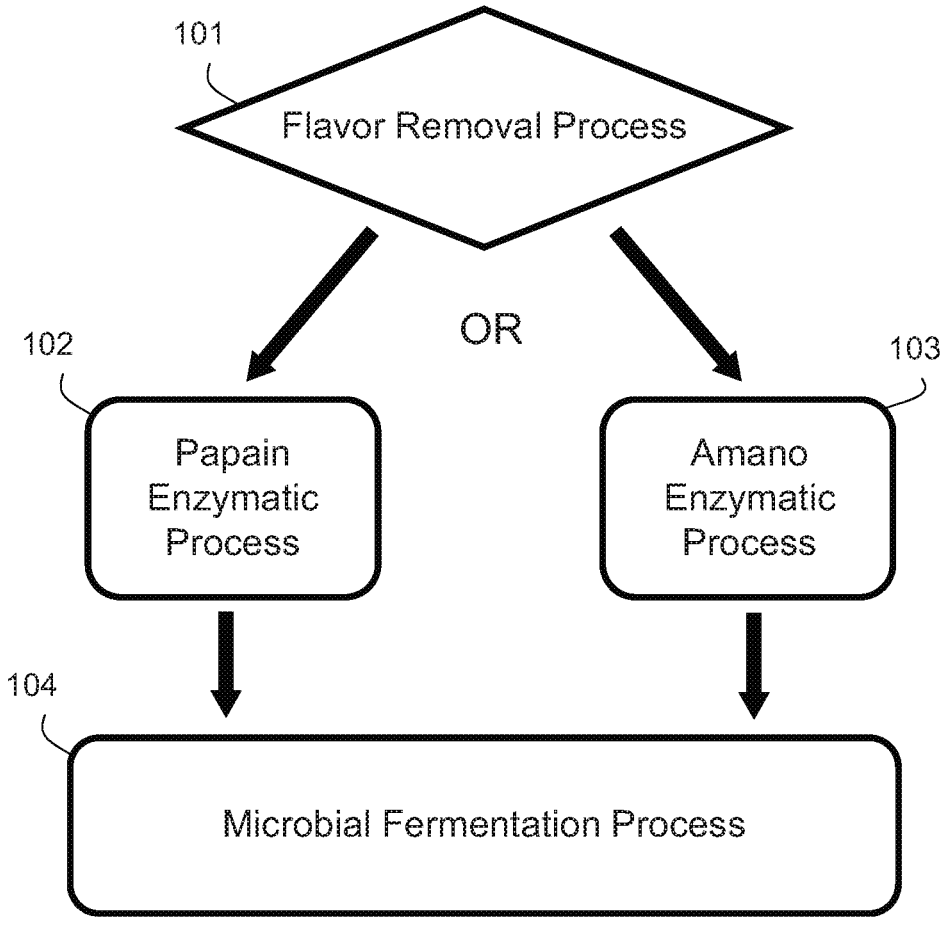
FIG. 1A is an example of a flow chart illustrating a process for preparing a food composition as a cream cheese alternative by using nuts from *Canarium* species.
Figure 2A:
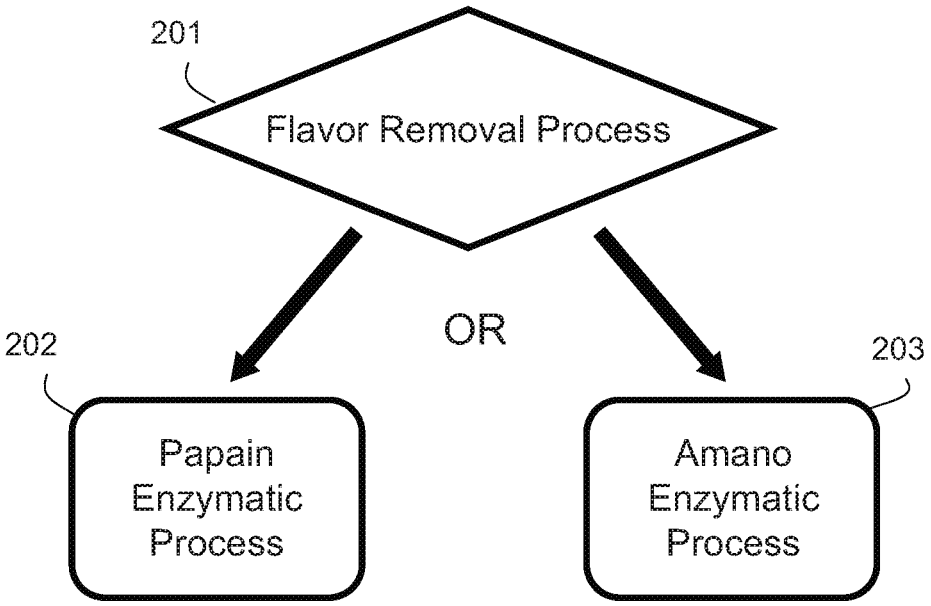
FIG. 2A is an example of a flow chart illustrating a process for preparing a food composition as a dessert alternative by using nuts from *Canarium* species.
Figure 2B:
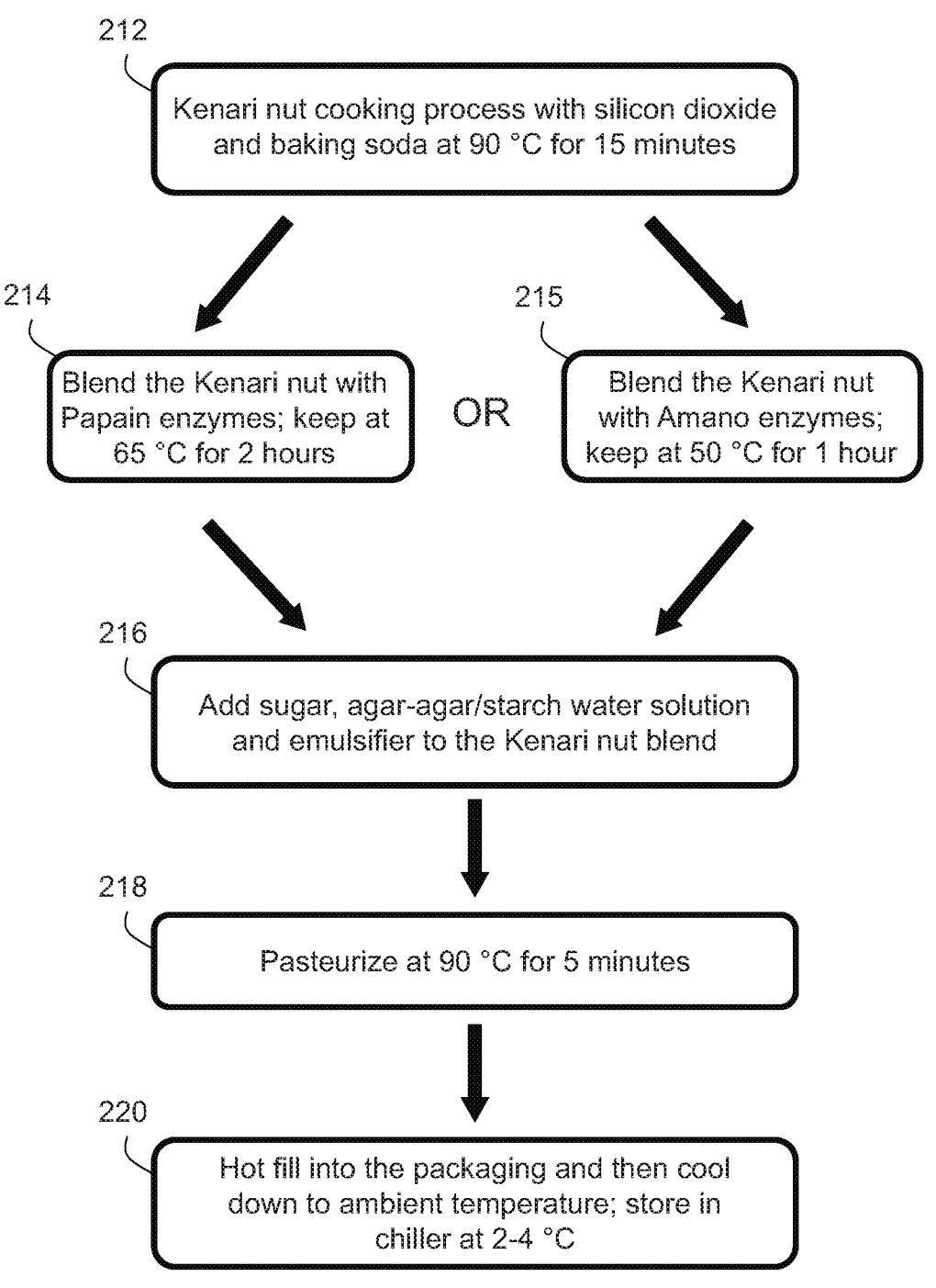
FIG. 2B is another example of a flow chart illustrating a process for preparing a food composition as a dessert alternative by using nuts from *Canarium* species.
Figure 3A:
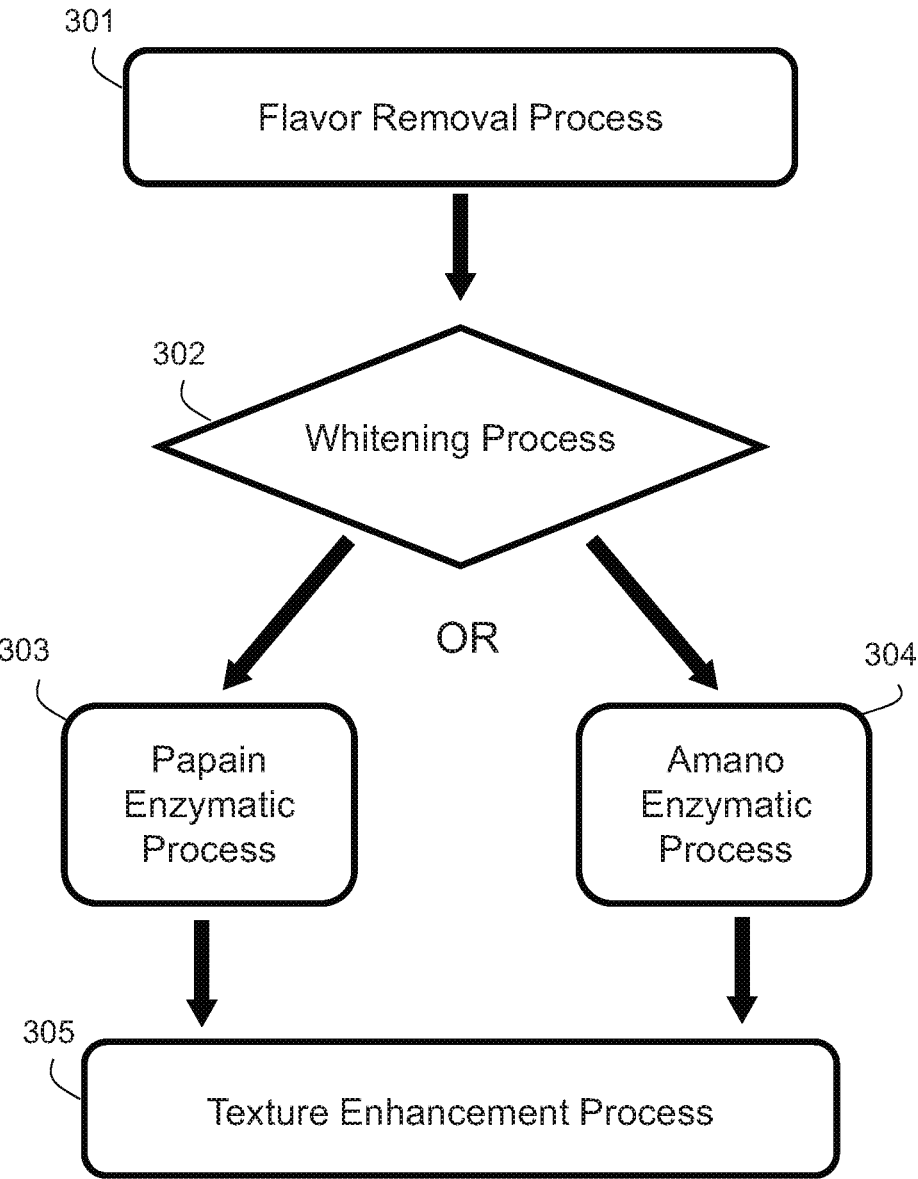
FIG. 3A is an example of a flow chart illustrating a process for preparing a food composition as an ice cream alternative by using nuts from *Canarium* species.
Figure 4A:
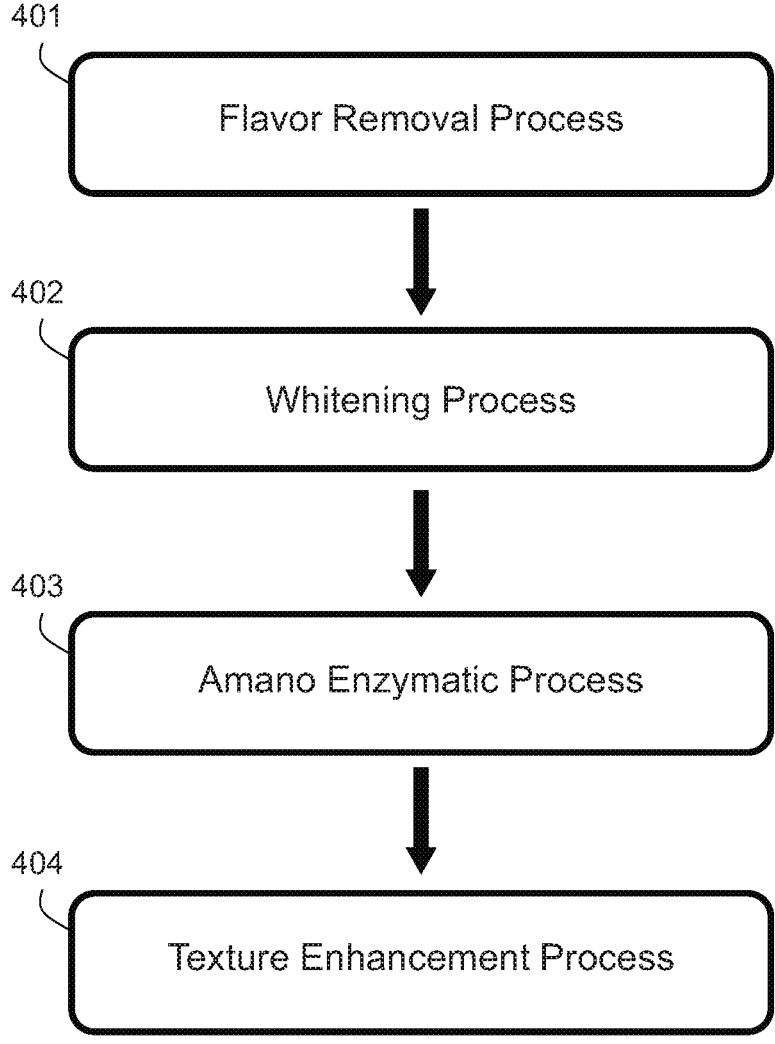
FIG. 4A is an example of a flow chart illustrating a process for preparing a food composition as an ice cream alternative by using nuts from *Cyperus esculantus;*

The present teachings illustrate examples of processes for preparing substitutes for dairy products without animal milk by using Kenari nut to produce a substitute for cream cheese as shown in FIGS. 1A and 1B, using Kenari nut to produce a substitute for dessert as shown in FIGS. 2A and 2B, using Kenari nut to produce a substitute for ice cream as shown in FIGS. 3A and 3B, and using tiger nut to produce a substitute for ice cream as shown in FIGS. 4A and 4B. It is noted that although Kenari nut is used for illustration with reference to FIGS. 1-3, other species from the *Canarium* nuts are also applicable to the methods or processes illustrated therein.

Referring to FIG. 1A, an example of a process for using Kenari nuts to create cream cheese substitute is illustrated. In step 101, a flavor removal process is provided to remove the vegetable off-flavor from the Kenari nut. The flavor removal process includes adding water in an amount equivalent to 150 wt. % (±5 wt. %) of Kenari nut in a container; adding silicon dioxide in an amount equivalent to 0.5 wt. % (±0.1 wt. %) of Kenari nut in the container; heating the water and silicon dioxide suspension until boiling; adding the Kenari nut into the boiled suspension and sustaining heat until the temperature reaches 90° C. (±2° C.); adding baking powder in an amount equivalent to 2.5 wt. % (±1.0 wt. %) of Kenari nut in the container; cooking the mixture thereof in the container for 15 minutes (±2 minutes) at 90° C. (±2° C.); and draining the nut from the mixture and rinsing the nut with fresh water.

After the off-flavor is removed from the nut, an enzymatic step may be used with a variety of enzymes to process the nut further. In the example illustrated in FIG. 1A, two different enzymes are alternatively used in steps 102, 103. In step 102, the enzymatic process is provided using papain as enzyme. In this process, the cooked Kenari nut is added to a food blender; papain enzyme in an amount equivalent to 0.35 wt. % (±0.10 wt. %) of Kenari nut protein (generally, protein amounts on average 13.7 wt. % of Kenari nut) is added to the food blender; table salt in an amount equivalent to 1.46 wt. % (±0.20 wt. %) of Kenari nut is added to the food blender; reverse osmosis (RO) water in an amount equivalent to 54 wt. % (±5 wt. %) of Kenari nut is added to the food blender; the ingredients are blended until the mixture is smooth like a cream, for example, with a particle size below 25μ; and the blended mixture is kept at 65° C. (±2° C.) for 2 hours (±15 minutes) with or without agitation for the purpose of completing the enzymatic reaction.

In step 103, the enzymatic process is provided using more than one enzyme. In this process, the cooked Kenari nut is added to a food blender; a dry mixture of three enzymes— Thermoase PC10F in an amount equivalent to 1 wt. % (±0.2 wt. %) of Kenari nut protein, Lipase AY30SD in an amount equivalent to 0.01 wt. % (±0.005 wt. %) of Kenari nut fat (generally, fat amounts on average 66 wt. % of Kenari nut), and PG500 in an amount equivalent to 5 wt. % (±1 wt. %) of Kenari nut protein—is prepared and added to the food blender; table salt in an amount equivalent to 1.46 wt. % (±0.20 wt. %) of Kenari nut is added to the mixture; reverse osmosis (RO) water in an amount equivalent to 54 wt. % (±5 wt. %) of Kenari nut is added to the mixture; the ingredients are blended until the mixture is smooth like a cream, for example, with a particle size below 25μ; and the blended mixture is kept at 50° C. (±2° C.) for 1 hour (±15 minutes) with or without agitation for the purpose of completing the enzymatic reaction.

Thermoase PC10F is a bacterial neutral metalloprotease preparation manufactured by an unique fermentation process using a selected strain of *Geobacillus stearothermophilus*, and is commercially available from Amano Enzyme, Inc. Lipase AY30SD is Triacylglycerol lipase manufactured by a unique fermentation process with a selected strain of *Candida cylindracea*, and is commercially available from Amano Enzyme, Inc. PG500 (Protein-Glutaminase 500) is manufactured by a unique fermentation process with a selected strain of *Chryseobacterium proteolyticum*, and is commercially available from Amano Enzyme, Inc.

After the enzymatic process such as step 102 or 103 is completed, a microbial fermentation step may be used with a variety of microbes in order to process the nuts further. In the example illustrated in FIG. 1A, in step 104, 2 UC lyofast V SAB1 and 1 UC lyofast V M01 N is added to 100 liters Kenari nut-based mixture (i.e., the mixture after the enzymatic process), and together fermented at 36° C. or within a range of 35° C. to 37° C. for at least 7 hours. Calcium citrate in an amount equivalent to 0.15 wt. % or within a range of 0.10 wt. % to 0.20 wt. % of Kenari nut may be added with lyofast V M01 n for the development of flavors similar to dairy cheese. "UC" refers to a unit of measurement for culture material.

Lyofast V SAB1 consists of specifically selected strains of *Streptococcus thermophilus* added with probiotic strains of *Lactobacillus acidophilus* and *Bifidobacterium animalis* subspecies *lactis*, and is commercially available from Sacco System. Lyofast V M01 N is a freeze-dried mesophilic culture and consists of specifically selected strains of *Lactococcus lactis* subspecies *lactis, Lactococcus lactis* subspecies *cremoris, Lactococcus lactis* subspecies *lactis* biovar, diacetylactis, and *Leuconostoc mesenteroides* subspecies *mesenteroides*, and is commercially available from Sacco System.

In some embodiments, additional processes may be added. For example, after the enzymatic process and before the microbial fermentation process, Konjac gum, dextrose, agar-agar water solution, calcium citrate, and nutritional yeast may be added to the Kenari nut mixture, and together pasteurized at 80° C. (±2° C.) for a time between four and six minutes, for example five minutes, and cool down to 30° C. (±2° C.). As another example, after the microbial fermentation process, the mixture may be pasteurized at 70° C. (±2° C.) for a time between one minute and three minutes, and for example two minutes.

For packaging and storing, the processed Kenari-nut based substitute of cream cheese may be hot filled into the packaging container and cool down to ambient temperature, and stored at 2° C. to 4° C. In some embodiments, the cooling down may be performed naturally. In other embodiments, the cooling down may be assisted with the use of a chiller, refrigeration machine, or the like.

Referring to FIG. 1B, an example of a process for using Kenari nuts to create cream cheese substitute is illustrated. In step 112, a flavor removal process is provided to remove the vegetable off-flavor from the Kenari nut. The flavor removal process includes adding water in an amount equivalent to 150 wt. % (±5 wt. %) of Kenari nut in a container; adding silicon dioxide in an amount equivalent to 0.5 wt. % (±0.1 wt. %) of Kenari nut in the container; heating the water and silicon dioxide suspension until boiling; adding the Kenari nut into the boiled suspension and sustaining heat until the temperature reaches 90° C. (±2° C.); adding baking powder in an amount equivalent to 2.5 wt. % (±1.0 wt. %) of Kenari nut in the container; cooking the mixture thereof in the container for 15 minutes (±2 minutes) at 90° C. (±2° C.); and draining the nut from the mixture and rinsing the nut with fresh water.

After the off-flavor is removed from the nut, an enzymatic step may be used with a variety of enzymes to process the nut further. In the example illustrated in FIG. 1B, two different enzymatic processes are alternatively used in steps 114, 115. In step 114, the enzymatic process is provided using papain as the enzyme. In this process, the cooked Kenari nut is added to a food blender; papain enzyme in an amount equivalent to 0.35 wt. % (±0.10 wt. %) of Kenari nut protein (generally, protein amounts on average 13.7 wt. % of Kenari nut) is added to the food blender; table salt in an amount equivalent to 1.46 wt. % (±0.20 wt. %) of Kenari nut is added to the food blender; reverse osmosis (RO) water in an amount equivalent to 54 wt. % (±5 wt. %) of Kenari nut is added to the food blender; the ingredients are blended until the mixture is smooth like a cream, for example, with a particle size below 25μ; and the blended mixture is kept at 65° C. (±2° C.) for 2 hours (±15 minutes) without agitation for the purpose of completing the enzymatic reaction.

In step 115, the enzymatic process is provided using more than one enzyme. In this process, the cooked Kenari nut is added to a food blender; a dry mixture of four enzymes-Thermoase PC10 in an amount equivalent to 1 wt. % (±0.2 wt. %) of Kenari nut protein, Lipase AY30SD in an amount equivalent to 0.01 wt. % (±0.005 wt. %) of Kenari nut fat, PG500 in an amount equivalent to 5 wt. % (±1 wt. %) of Kenari nut protein, and Gluczyme AF6 in an amount equivalent to 0.5 wt. % (±0.1 wt. %) of Kenari nut carbohydrates (generally, carbohydrates amounts on average 11 wt. % of Kenari nut)—is prepared and added to the food blender; table salt in an amount equivalent to 0.55 wt. % (±0.10 wt. %) of Kenari nut is added to the mixture; calcium citrate in an amount equivalent to 0.55 wt. % (±0.10 wt. %) of Kenari nut is added to the mixture; reverse osmosis (RO) water in an amount equivalent to 18 wt. % (±5 wt. %) of Kenari nut is added to the mixture; the ingredients are blended until the mixture is smooth like a cream, for example, with a particle size below 25μ; and the blended mixture is kept at 50° C. (±2° C.) for 1 hour (±15 minutes) without agitation for the purpose of completing the enzymatic reaction.

Thermoase PC10 is a bacterial neutral metalloprotease preparation manufactured by an unique fermentation process using a selected strain of *Geobacillus stearothermophilus*, and is commercially available from Amano Enzyme, Inc. Lipase AY30SD is Triacylglycerol lipase manufactured by a unique fermentation process with a selected strain of *Candida cylindracea*, and is commercially available from Amano Enzyme, Inc. PG500 (Protein-Glutaminase 500) is manufactured by a unique fermentation process with a selected strain of *Chryseobacterium proteolyticum*, and is commercially available from Amano Enzyme, Inc. Gluczyme AF6 is a kind of glucose amylase which is used in glucose production, and is commercially available from Amano Enzyme, Inc.

In step 116, a process for a final blend before fermentation is provided. A dry mix of dextrose and fava bean protein isolate-dextrose in an amount equivalent to 2 wt. % (±0.5 wt. %) of Kenari nut fat and fava bean protein isolate of 90% protein in an amount equivalent to 6.1 wt. % (±1.0 wt. %) of Kenari nut—is prepared and water is added in an amount equivalent to 29.1 wt. % (±5.0 wt. %) of Kenari nut and is mixed to create a homogeneous slurry; Agar-Agar type Agaroles 50 in an amount equivalent to 0.91 wt. % (±0.20 wt. %) of Kenari nut is mixed with 90° C. (±2° C.) water in an amount equivalent to 8.2 wt. % (±1.0 wt. %) of Kenari until agar-agar is fully dissolved into an agar-agar solution; the dextrose and fava bean protein isolate is added to the enzymatically treated Kenari nut mixture and blended homogeneously; the agar-agar solution is added to the enzymatically treated Kenari nut mixture and blended homogeneously; nutritional yeast equivalent to 1.8 wt. % (±0.5 wt. %) of Kenari nut is added to the enzymatically treated Kenari nut mixture and blended homogeneously.

Step 116 may also be used when the Kenari nut mix is processed with the papain enzyme. However, in some embodiments, the final blend process step 116 is not necessary when the Kenari nut mix is processed with the papain enzyme.

After the enzymatic process and final blend process, the Kenari-nut based mixture is pasteurized at 80° C. (±2° C.) for 5 minutes (±1 minute) in step 118.

In step 120, a microbial fermentation step may be used with a variety of microbes in order to process the nuts further. For example, the Kenari nut-based mixture is cooled down to 30° C. (±2° C.); 2 UC lyofast V SAB1 and 1 UC lyofast V M01 N is added to 100 liters Kenari nut-based mixture (i.e., the mixture after the enzymatic process and final blend process), and together fermented at 36° C. or within a range of 35° C. to 37° C. for at least 7 hours (e.g., 14 hours). Calcium citrate in an amount equivalent to 0.15 wt. % or within a range of 0.10 wt. % to 0.20 wt. % of Kenari nut may be added with lyofast V M01 N for the development of flavors similar to dairy cheese.

Lyofast V SAB1 consists of specifically selected strains of *Streptococcus thermophilus* added with probiotic strains of *Lactobacillus acidophilus* and *Bifidobacterium animalis* subspecies *lactis*, and is commercially available from Sacco System. Lyofast V M01 N is a freeze-dried mesophilic culture and consists of specifically selected strains of *Lactococcus lactis* subspecies *lactis, Lactococcus lactis* subspecies *cremoris, Lactococcus lactis* subspecies *lactis* biovar, diacetylactis, and *Leuconostoc mesenteroides* subspecies *mesenteroides*.

In some embodiments, additional processes may be performed as shown in steps 122 and 124. For example, in step 122, the Kenari-nut based mixture is pasteurized at 70° C. (±2° C.) for 2 minutes (±30 seconds). In step 124, the processed Kenari-nut based substitute of cream cheese may be hot filled into the packaging container and cooled down to ambient temperature and stored at 2° C. to 4° C. for packaging and storing. In some embodiments, the cooling down may be performed naturally. In other embodiments, the cooling down may be assisted with the use of a chiller, refrigeration machine, or the like.

Referring to FIG. 2A, an example of a process for using Kenari nuts to create dessert substitute is illustrated. In step 201, a flavor removal process is provided to remove the vegetable off-flavor from the Kenari nut. The flavor removal process includes adding water in an amount equivalent to 150 wt. % (±5 wt. %) of Kenari nut in a container; adding silicon dioxide in an amount equivalent to 0.4 wt. % (±0.1 wt. %) of Kenari nut in the container; heating the water and silicon dioxide suspension until boiling; adding the Kenari nut into the boiled suspension and sustaining heat until the temperature reaches 90° C. (±2° C.); adding baking soda in an amount equivalent to 2.5 wt. % (±1.0 wt. %) of Kenari nut in the container; cooking the mixture thereof in the container for 15 minutes (±2 minutes) at 90° C. (±2° C.); and draining the nut from the mixture and rinsed the nut with fresh water.

After the off-flavor is removed from the nut, an enzymatic step may be used with a variety of enzymes to process the nut further. In the example illustrated in FIG. 2A, two different enzymes are alternatively used in steps 202, 203. In step 202, the enzymatic process is provided using papain as enzyme. In this process, the cooked Kenari nut is added to a food blender; papain enzyme in an amount equivalent to 0.35 wt. % (±0.10 wt. %) of Kenari nut protein (generally, protein amounts on average 13.7 wt. % of Kenari nut) is added to the food blender; reverse osmosis (RO) water in an amount equivalent to 123 wt. % (±5 wt. %) of Kenari nut is added to the food blender; the ingredients are blended until the mixture is smooth like a cream, for example, with a particle size below 25μ; and the blended mixture is kept at 65° C. (±2° C.) for 2 hours (±15 minutes) without agitation for the purpose of completing the enzymatic reaction. In step 203, the enzymatic process is provided using more than one enzyme. In this process, the cooked Kenari nut is added to a food blender; a dry mixture of three enzymes-Thermoase PC10F in an amount equivalent to 1 wt. % (±0.2 wt. %) of Kenari nut protein, Lipase AY30SD in an amount equivalent to 0.01 wt. % (±0.005 wt. %) of Kenari nut fat, and PG500 in an amount equivalent to 5 wt. % (±1 wt. %) of Kenari nut protein—is prepared and added to the food blender; reverse osmosis (RO) water in an amount equivalent to 123 wt. % (±5 wt. %) of Kenari nut is added to the mixture; the ingredients are blended until the mixture is smooth like a cream, for example, with a particle size below 25μ; and the blended mixture is kept at 50° C. (±2° C.) for 1 hour (±15 minutes) without agitation for the purpose of completing the enzymatic reaction.

In some embodiments, additional processes may be added. For example, after the enzymatic process, sugar, agar-agar and/or starch water solution, and emulsifier may be added to the Kenari nut mixture, and together pasteurized at 90° C. (±2° C.) for a time between four and six minutes, for example five minutes.

For packaging and storing, the processed Kenari-nut based substitute of dessert may be hot filled into the packaging container and cool down to ambient temperature, and stored at 2° C. to 4° C. In some embodiments, the cooling down may be performed naturally. In other embodiments, the cooling down may be assisted with the use of a chiller, refrigeration machine, or the like.

Referring to FIG. 2B, an example of a process for using Kenari nuts to create dessert substitute is illustrated. In step 212, a flavor removal process is provided to remove the vegetable off-flavor from the Kenari nut. The flavor removal process includes adding water in an amount equivalent to 150 wt. % (±5 wt. %) of Kenari nut in a container; adding silicon dioxide in an amount equivalent to 0.4 wt. % (±0.1 wt. %) of Kenari nut in the container; heating the water and silicon dioxide suspension until boiling; adding the Kenari nut into the boiled suspension and sustaining heat until the temperature reaches 90° C. (±2° C.); adding baking soda in an amount equivalent to 2.5 wt. % (±1.0 wt. %) of Kenari nut in the container; cooking the mixture thereof in the container for 15 minutes (±2 minutes) at 90° C. (±2° C.); and draining the nut from the mixture and rinsed the nut with fresh water.

After the off-flavor is removed from the nut, an enzymatic step may be used with a variety of enzymes to process the nut further. In the example illustrated in FIG. 2B, two different enzymatic processes are alternatively used in steps 214, 215. In step 214, the enzymatic process is provided using papain as enzyme. In this process, the cooked Kenari nut is added to a food blender; papain enzyme in an amount equivalent to 0.35 wt. % (±0.10 wt. %) of Kenari nut protein (generally, protein amounts on average 13.7 wt. % of Kenari nut) is added to the food blender; reverse osmosis (RO) water in an amount equivalent to 123 wt. % (±5 wt. %) of Kenari nut is added to the food blender; the ingredients are blended until the mixture is smooth like a cream, for example, with a particle size below 25μ; and the blended mixture is kept at 65° C. (±2° C.) for 2 hours (±15 minutes) without agitation for the purpose of completing the enzymatic reaction.

In step 215, the enzymatic process is provided using more than one enzyme. In this process, the cooked Kenari nut is added to a food blender; a dry mixture of three enzymes-Thermoase PC10 in an amount equivalent to 1 wt. % (±0.2 wt. %) of Kenari nut protein, Lipase AY30SD in an amount equivalent to 0.01 wt. % (±0.005 wt. %) of Kenari nut fat, and PG500 in an amount equivalent to 5 wt. % (±1 wt. %) of Kenari nut protein—is prepared and added to the food blender; reverse osmosis (RO) water in an amount equivalent to 123 wt. % (±5 wt. %) of Kenari nut is added to the mixture; the ingredients are blended until the mixture is smooth like a cream, for example, with a particle size below 25μ; and the blended mixture is kept at 50° C. (±2° C.) for 1 hour (±15 minutes) without agitation for the purpose of completing the enzymatic reaction.

After either the papain or Amano 3 enzymatic process, in step 216, sugar, agar-agar, and/or starch water solution, and emulsifier may be added to the Kenari nut mixture. Thereafter, in step 218, the Kenari-nut based mixture is pasteurized at 90° C. (±2° C.) for 5 minutes (±1 minute).

In step 220, the processed Kenari-nut based substitute of cream cheese may be hot filled into a packaging container and cooled down to ambient temperature and stored at 2° C. to 4° C. for packaging and storing. In some embodiments, the cooling down may be performed naturally. In other embodiments, the cooling down may be assisted with the use of a chiller, refrigeration machine, or the like.

Referring to FIG. 3A, an example of a process for using Kenari nuts to create ice cream substitute is illustrated. In step 301, a flavor removal process is provided to remove the vegetable off-flavor from the Kenari nut. The flavor removal process includes adding water in an amount equivalent to 154 wt. % (±5 wt. %) of Kenari nut in a container; adding silicon dioxide in an amount equivalent to 0.4 wt. % (±0.1 wt. %) of Kenari nut in the container; heating the water and silicon dioxide suspension until boiling; adding the Kenari nut into the boiled suspension and sustaining heat until the temperature reaches 90° C. (±2° C.); adding baking soda in an amount equivalent to 2.5 wt. % (±1.0 wt. %) of Kenari nut in the container; cooking the mixture thereof in the container for 15 minutes (±2 minutes) at 90° C. (±2° C.); and draining the nut from the mixture and rinsed the nut with fresh water.

After the off-flavor is removed from the nut, a whitening step 302 is used to lighten the color of the processed Kenari nut. In step 302, a sugar solution including 71.4 wt. % sugar (±5.0 wt. %) and 28.6 wt. % water (±5.0 wt. %) is prepared, and the sugar solution in an amount equivalent to 85.9 wt. % (±5.0 wt. %) of Kenari nut is mixed with the Kenari nut. The mixture thereof rests for 24 hours (±2 hours). It is noted that the ratio of sugar to water in the sugar solution and/or the ratio of the sugar solution to the nut may change to adjust the sweetness of the final product.

After the whitening step, an enzymatic step may be used with a variety of enzymes to process the nut further. In the example illustrated in FIG. 3A, two different enzymes are alternatively used in steps 303, 304. In step 303, the enzymatic process is provided using papain as enzyme. In this process, the mixture of cooked Kenari nut and sugar solution (i.e., the mixture after the whitening step) is added to a food blender; papain enzyme in an amount equivalent to 0.35 wt. % (±0.10 wt. %) of Kenari nut protein (generally, protein amounts on average 13.7 wt. % of Kenari nut) is added to the food blender; baking soda (i.e., sodium bicarbonate) in an amount equivalent to 1.1 wt. % (±0.2 wt. %) of Kenari nut is added to the food blender; reverse osmosis (RO) water in an amount equivalent to 34.9 wt. % (±5.0 wt. %) of Kenari nut is added to the food blender; the ingredients are blended until the mixture is smooth like a cream, for example, with a particle size below 25μ; and the blended mixture is kept at 65° C. (±2° C.) for 2 hours (±15 minutes) without agitation for the purpose of completing the enzymatic reaction.

In step 304, the enzymatic process is provided using more than one enzyme. In this process, the mixture of cooked Kenari nut and sugar solution (i.e., the mixture after the whitening step) is added to a food blender; a dry mixture of three enzymes-Thermoase PC10F in an amount equivalent to 1 wt. % (±0.2 wt. %) of Kenari nut protein, Lipase AY30SD in an amount equivalent to 0.01 wt. % (±0.005 wt. %) of Kenari nut fat, and PG500 in an amount equivalent to 5 wt. % (±1 wt. %) of Kenari nut protein—is prepared and added to the food blender; baking soda (i.e., sodium bicarbonate) in an amount equivalent to 1.1 wt. % (±0.2 wt. %) of Kenari nut is added to the mixture; reverse osmosis (RO) water in an amount equivalent to 34.9 wt. % (±5.0 wt. %) of Kenari nut is added to the mixture; the ingredients are blended until the mixture is smooth like a cream, for example, with a particle size below 25μ; and the blended mixture is kept at 50° C. (±2° C.) for 1 hour (±15 minutes) without agitation for the purpose of completing the enzymatic reaction.

It is noted that baking soda described in steps 303, 304 is added to enhance the texture of ice cream substitute product. Adding baking soda in the gelato paste formula reduces the size of the ice crystals during the ice cream process and allows the mix to achieve the soft and silky texture typical of ice-cream. This process is referred to as texture enhancement process. The texture enhancement process may be included in the enzymatic process such as step 303 or 304 as described above, or may be provided as a separate step 305 as shown in FIG. 3A.

In some embodiments, additional processes may be added. For example, after the enzymatic process and texture enhancement process, dextrose, high fructose syrup, stabiliser water solution, potassium sorbate, and vanilla extract may be added to the Kenari nut mixture, and together pasteurized at 70° C. (±2° C.) for 15 minutes (±2 minutes).

For packaging and storing, the processed Kenari-nut based substitute of ice cream may be hot filled into the packaging container and cool down to ambient temperature, for example, around 22° C. to 25° C., and stored at a temperature lower than 25° C. In some embodiments, the cooling down may be performed naturally. In other embodiments, the cooling down may be assisted with the use of a chiller, refrigeration machine, or the like.

Referring to FIG. 3B, an example of a process for using Kenari nuts to create ice cream substitute is illustrated. In step 312, a flavor removal process is provided to remove the vegetable off-flavor from the Kenari nut. The flavor removal process includes adding water in an amount equivalent to 154 wt. % (±5 wt. %) of Kenari nut in a container; adding silicon dioxide in an amount equivalent to 0.4 wt. % (±0.1 wt. %) of Kenari nut in the container; heating the water and silicon dioxide suspension until boiling; adding the Kenari nut into the boiled suspension and sustaining heat until the temperature reaches 90° C. (±2° C.); adding baking soda in an amount equivalent to 2.5 wt. % (±1.0 wt. %) of Kenari nut in the container; cooking the mixture thereof in the container for 15 minutes (±2 minutes) at 90° C. (±2° C.); and draining the nut from the mixture and rinsed the nut with fresh water.

After the off-flavor is removed from the nut, a whitening step 314 is used to lighten the color of the processed Kenari nut. In step 314, a sugar solution including 71.4 wt. % (±5.0 wt. %) sugar and 28.6 wt. % (±5.0 wt. %) water is prepared, and the sugar solution in an amount equivalent to 76.6 wt. % (±5.0 wt. %) of Kenari nut is mixed with the Kenari nut. The mixture thereof rests for 24 hours (±2 hours). It is noted that the ratio of sugar to water in the sugar solution and/or the ratio of the sugar solution to the nut may change to adjust the sweetness of the final product.

After the whitening step, an enzymatic step is used to process the nut further. In step 316, the enzymatic process is provided using papain as enzyme. In this process, the mixture of cooked Kenari nut and sugar solution (i.e., the mixture after the whitening step) is added to a food blender; papain enzyme in an amount equivalent to 0.35 wt. % (±0.10 wt. %) of Kenari nut protein (generally, protein amounts on average 13.7 wt. % of Kenari nut) is added to the food blender; baking soda (i.e., sodium bicarbonate) in an amount equivalent to 1.1 wt. % (±0.2 wt. %) of Kenari nut is added to the food blender; reverse osmosis (RO) water in an amount equivalent to 34.9 wt. % (±5.0 wt. %) of Kenari nut is added to the food blender; the ingredients are blended until the mixture is smooth like a cream, for example, with a particle size below 25μ; and the blended mixture is kept at 65° C. (±2° C.) for 2 hours (±15 minutes) without agitation for the purpose of completing the enzymatic reaction.

It is noted that baking soda described in step 316 is added to enhance the texture of ice cream substitute product. Adding baking soda in the gelato paste formula reduces the size of the ice crystals during the ice cream process and allows the mix to achieve the soft and silky texture typical of ice cream. This process is referred to as a texture enhancement process. The texture enhancement process may be included in the enzymatic process such as step 316 described above, or may be provided as a separate step 318 as shown in FIG. 3B.

In some other embodiments, the enzymatic process step 316 may be provided using more than one enzyme. For example, the mixture of cooked Kenari nut and sugar solution (i.e., the mixture after the whitening step) may be added to a food blender; a dry mixture of three enzymes-Thermoase PC10F in an amount equivalent to 1 wt. % (±0.2 wt. %) of Kenari nut protein, Lipase AY30SD in an amount equivalent to 0.01 wt. % (±0.005 wt. %) of Kenari nut fat, and PG500 in an amount equivalent to 5 wt. % (±1 wt. %) of Kenari nut protein—may be prepared and added to the food blender; baking soda (i.e., sodium bicarbonate) in an amount equivalent to 1.1 wt. % (±0.2 wt %) of Kenari nut may be added to the mixture; reverse osmosis (RO) water in an amount equivalent to 34.9 wt. % (±5.0 wt %) of Kenari nut may be added to the mixture; the ingredients may then be blended until the mixture is smooth like a cream, for example, with a particle size below 25μ; and the blended mixture may be kept at 50° C. (±2° C.) for 1 hour (±15 minutes) without agitation for the purpose of completing the enzymatic reaction.

In step 318, after the enzymatic process, dextrose, high fructose syrup, agar-agar, Mung bean protein isolate, vegetable fiber, vanilla extract, and potassium sorbate are added to the Kenari-nut mixture. Thereafter, in step 320, the Kenari-nut based mixture is pasteurized at 70° C. (±2° C.) for 15 minutes (±2 minutes).

In step 322, the processed Kenari-nut based substitute of ice cream is hot filled into the packaging container and cool down to ambient temperature, and stored at a temperature lower than 25° C. In some embodiments, the cooling down may be performed naturally. In other embodiments, the cooling down may be assisted with the use of a chiller, refrigeration machine, or the like.

Referring to FIG. 4A, an example of a process for using tiger nuts to create ice cream substitute is illustrated. In step 401, a flavor removal process is provided to remove the vegetable off-flavor from the tiger nut. Before processing, the tiger nut, water in an amount equivalent to 250 wt. % (±5 wt %) of tiger nut, and baking powder in an amount equivalent to 4.6 wt. % (±1.0 wt %) of tiger nut are added in a container and the tiger nut therein are soaked for 24 hours (±2 hours) and drained from the soaking solution. The flavor removal process is then provided, which includes adding water in an amount equivalent to 216 wt. % (±5 wt %) of tiger nut in a container; adding silicon dioxide in an amount equivalent to 0.6 wt. % (±0.1 wt %) of tiger nut to the water in the container; heating the water and silicon dioxide suspension until boiling; adding the tiger nut in the boiled suspension and sustaining heat until the temperature reaches 90° C. (±2° C.); adding baking powder in an amount equivalent to 3.6 wt. % (±1.0 wt %) of tiger nut in the container; cooking the mixture thereof in the container for 15 minutes (±2 minutes) at 90° C. (±2° C.); and draining the nut from the mixture and rinsed the nut with fresh water.

After the off-flavor is removed from the nut, a whitening step 402 is used to lighten the color of the processed tiger nut. In step 402, a sugar solution including 71.4 wt. % (±5 wt %) sugar and 28.6 wt. % (±5 wt %) water is prepared, and the sugar solution in an amount equivalent to 90.7 wt. % (±5 wt %) of tiger nut is mixed with the tiger nut. The mixture thereof rests for 24 hours (±2 hours). It is noted that the ratio of sugar to water in the sugar solution and/or the ratio of the sugar solution to the nut may change to adjust the sweetness of the final product. In some embodiments, step 402 may be omitted, that is, a whitening step may be not required.

After the whitening step or the flavor removal step, an enzymatic step may be used with a variety of enzymes to process the nut further. In the example illustrated in FIG. 4A, in step 403, the enzymatic process is provided using more than one enzyme. In one example of the process in step 403, the mixture of cooked tiger nut and sugar solution (i.e., the mixture after the whitening step) is added to a food blender; Kleistase E5NC in an amount equivalent to 0.5 wt. % (±0.1 wt %) of tiger nut fiber is added to the food blender; the mixture thereof is heated to 65° C. (±2° C.) and rest for 1 hour (±15 minutes) with or without agitation to complete the enzymatic reaction; a dry mixture of another two enzymes-Gluczyme AF6 in an amount equivalent to 0.5 wt. % (±0.1 wt %) of tiger nut carbohydrates and PG500 in an amount equivalent to 5 wt. % (±1 wt %) of tiger nut protein—is prepared and added to the food blender; reverse osmosis (RO) water in an amount equivalent to 60 wt. % (±5 wt %) of tiger nut is added to the mixture; the ingredients are blended until the mixture is smooth like a cream, for example, with a particle size below 25μ; and the blended mixture is kept at 50° C. (±2° C.) for 1 hour (±15 minutes) with or without agitation for the purpose of completing the enzymatic reaction. In another example of the process in step 403, the mixture of cooked tiger nut and sugar solution (i.e., the mixture after the whitening step) is added to a food blender; a dry mixture of four enzymes—Hemicellulase 90 in an amount equivalent to 0.5 wt. % (±0.1 wt %) of tiger nut, Gluczyme AF6 in an amount equivalent to 0.5 wt. % (±0.1 wt %) of tiger nut, PG500 in an amount equivalent to 5 wt. % (±1 wt %) of tiger nut protein, and Lipase AY30SD in an amount equivalent to 0.001 wt. % (±0.0005 wt %) of tiger nut fat—is prepared and added to the food blender; reverse osmosis (RO) water in an amount equivalent to 60 wt. % (±5 wt %) of tiger nut is added to the mixture; the ingredients are blended until the mixture is smooth like a cream, for example, with a particle size below 25μ; and the blended mixture is kept at 50° C. (±2° C.) for 1 hour (±15 minutes) with or without agitation for the purpose of completing the enzymatic reaction.

Kleistase ESNC is a bacterial endo α-amylase (EC 3.2.1.1) preparation derived from *Bacillus amyloliquefaciens*, and is commercially available from Amano Enzyme, Inc. Gluczyme AF6 is a glucoamylase preparation manufactured by a unique fermentation process using a selected strain of *Rhizopus* specie, and is commercially available from Amano Enzyme, Inc. Hemicellulase 90 is an Endo-1, 4 β-D-xylanase manufactured by a unique fermentation process with a selected strain of *Aspergillus niger*, and is commercially available from Amano Enzyme, Inc.

A texture enhancement step may be added to produce a desired texture of the tiger nut. In the example illustrated in FIG. 4A, the texture enhancement process in step 404 is provided after the enzymatic process, however, it should be understood by a person of ordinary skill in the art that the texture enhancement process may be included in the enzymatic process. In the texture enhancement process, baking soda (i.e., sodium bicarbonate) in an amount equivalent to 1.4 wt. % (±0.2 wt %) of tiger nut is added to the food blender. Adding baking soda in the gelato paste formula reduces the size of the ice crystals during the ice cream process and allows the mix to achieve the soft and silky texture typical of ice-cream.

In some embodiments, additional processes may be added. For example, after the enzymatic process and texture enhancement process, dextrose, high fructose syrup, stabiliser water solution, and vanilla extract may be added to the tiger nut mixture, and together pasteurized at 70° C. (±2° C.) for 15 minutes (±2 minutes).

For packaging and storing, the processed tiger-nut based substitute of ice cream may be hot filled into the packaging container and cool down to ambient temperature, for example, around 22° C. to 25° C., and stored at a temperature lower than 25° C. In some embodiments, the cooling down may be performed naturally. In other embodiments, the cooling down may be assisted with the use of a chiller, refrigeration machine, or the like.

Referring to FIG. 4B, an example of a process for using tiger nuts to create ice cream substitute is illustrated. In step 412, a tiger nut soaking process is provided before flavor removal process. In the soaking process, water in an amount equivalent to 250 wt. % (±5 wt. %) of tiger nut and citric acid monohydrate in an amount equivalent to 3.5 wt. % (±1.0 wt. %) of tiger nut are mixed. The tiger nut is then added to the citric acid monohydrate solution and the tiger nut therein are soaked for 24 hours (±2 hours) and then drained from the soaking solution.

In step 414, the flavor removal process is provided, which includes adding water in an amount equivalent to 240 wt. % (±5 wt. %) of tiger nut in a container; adding silicon dioxide in an amount equivalent to 1.2 wt. % (±0.2 wt. %) of tiger nut to the water in the container; heating the water and silicon dioxide suspension until boiling; adding the soaked tiger nut in the boiled suspension and sustaining heat until the temperature reaches 90° C. (±2° C.); adding baking soda (sodium bicarbonate) in an amount equivalent to 4 wt. % (±1 wt. %) of tiger nut in the container; cooking the mixture thereof in the container for 15 minutes (±2 minutes) at 90° C. (±2° C.); and draining the nut from the mixture and rinsed the nut with fresh water.

After the off-flavor is removed from the nut, a fiber hydrolysis is used to process the nut further. In step 416, water in an amount equivalent to 321 wt. % (±5 wt. %) of tiger nut is added to a container; the enzyme KLEISTASE ESNC in an amount equivalent to 0.5 wt. % (±0.1 wt. %) of tiger nut is added to the water; the cooked tiger and the water/enzyme solution is added to a food processor and blended into a homogenous mix; the temperature of the homogenous mix is raised to 70° C. (±2° C.), and the homogenous mix undergoes continuous slow mixing to allow the enzyme reaction to continue for 1 hour (±15 minutes).

With respect to step 416, some embodiments may involve the cooked tiger nut first being added to the food processor, the water being added to food processor, and then the enzyme being added to the food processor. Thereafter, all three components all blended into a homogenous mix before heating.

In step 418, after the fiber hydrolysis, the tiger nut milk is separated from the tiger nut pulp. For example, this may be done by filtering the tiger nut pulp using a cheese cloth to separate the tiger nut milk from the tiger nut pulp. In addition or alternatively, the tiger nut milk may be separated from the tiger nut pulp by means of mechanical or centrifugal filtration. In some embodiments, both a cheese cloth and a filtration unit may be used sequentially to separate the tiger nut milk from the tiger nut pulp.

After the tiger nut milk extraction step, the tiger nut milk is processed with enzymes. In step 420, enzyme PG500 in an amount equivalent to 0.14 wt. % (±0.05 wt. %) of extracted tiger nut milk is added to the tiger nut milk; enzyme Lipase AY30SD in an amount equivalent to 0.0005 wt. % (±0.0001 wt. %) of extracted tiger nut milk is added to the tiger nut milk; the temperature of the tiger nut milk and enzyme mixture is raised to 50° C. (±2° C.), and the enzyme reaction is allowed to continue for 1 hour (±15 minutes) with or without agitation.

After the enzymatic step, the tiger nut milk is processed into an ice cream paste blend. In step 422, baking soda in an amount equivalent to 0.48 wt. % (±0.1 wt. %) of tiger nut milk is added to the tiger nut milk; a sugar solution, with a ratio of 71.43 wt. % (±5 wt. %) sugar to 28.57 wt. % (±5 wt. %) water, in an amount equivalent to 27.7 wt. % (±5 wt. %) of tiger nut milk is added to the tiger nut milk; vegetable oil in an amount equivalent to 8.94 wt. % (±1.0 wt. %) of tiger nut milk is added to the tiger nut milk; dextrose in an amount equivalent to 7.08 wt. % (±1.0 wt. %) of tiger nut milk is added to the tiger nut milk; vegetable fiber in an amount equivalent to 3.12 wt. % (±1.0 wt. %) of tiger nut milk is added to the tiger nut milk; high fructose syrup in an amount equivalent to 6.9 wt. % (±1.0 wt. %) of tiger nut milk is added to the tiger nut milk; vegetable stabilizers mix in an amount equivalent to 1.13 wt. % (±0.2 wt. %) of tiger nut milk is added to the tiger nut milk; vanilla extract in an amount equivalent to 0.52 wt. % (±0.1 wt. %) of tiger nut milk is added to the tiger nut milk.

In step 424, the mixture may be pasteurized at 70° C. (±2° C.) for 15 minutes (±2 minutes). In other embodiments, the mixture may be pasteurized at 90° C. (±2° C.) for 1 minute (±10 seconds).

In step 426, the processed tiger nut based substitute of ice cream is hot filled into the packaging container, cool down to ambient temperature, for example, around 22° C. to 25° C., and stored in a refrigerator, for example at a temperature lower than 25° C. In some embodiments, the cooling down may be performed naturally. In other embodiments, the cooling down may be assisted with the use of a chiller, refrigeration machine, or the like.

Referring to FIG. 4C, an example of a process for using tiger nuts to create ice cream substitute is illustrated. In step 450, a tiger nut soaking process is provided before flavor removal process. In the soaking process, water in an amount equivalent to 250 wt. % (±5 wt. %) of tiger nut and baking powder in an amount equivalent to 4.6 wt. % (±1.0 wt. %) of tiger nut are added to the tiger nut. The tiger nut is then soaked for 24 hours (±2 hours) and then drained from the soaking solution.

In step 452, the flavor removal process is provided, which includes adding water in an amount equivalent to 240 wt. % (±5 wt. %) of tiger nut in a container; adding silicon dioxide in an amount equivalent to 0.6 wt. % (±0.1 wt. %) of tiger nut to the water in the container; heating the water and silicon dioxide suspension until boiling; adding the soaked tiger nut in the boiled suspension and sustaining heat until the temperature reaches 90° C. (±2° C.); adding baking powder in an amount equivalent to 3.6 wt. % (±1.0 wt. %) of tiger nut in the container; cooking the mixture thereof in the container for 15 minutes (±2 minutes) at 90° C. (±2° C.); and draining the nut from the mixture and rinsed the nut with fresh water.

After the off-flavor is removed from the nut, a whitening step 454 is used to lighten the color of the processed tiger nut. In step 454, a sugar solution including 71.4 wt. % (±5 wt %) sugar and 28.6 wt. % (±5 wt %) water is prepared, and the sugar solution in an amount equivalent to 90.7 wt. % (±5 wt %) of tiger nut is mixed with the tiger nut. The mixture thereof rests for 24 hours (±2 hours). It is noted that the ratio of sugar to water in the sugar solution and/or the ratio of the sugar solution to the nut may change to adjust the sweetness of the final product. In some embodiments, step 454 may be omitted, that is, a whitening step may be not required.

In step 456, the cooked tiger nut is added to a food processor; water in an amount equivalent to 321 wt. % (±5 wt. %) of tiger nut is added to a food processor; the Amano enzyme Kleistase E5 NC in an amount equivalent to 0.5 wt. % (±0.1 wt. %) of tiger nut fiber weight (generally, fiber amounts on average 8.9 wt. % of tiger nut) is added to the food processor; the temperature of the mixture is raised to 65° C. (±2° C.), and for 1 hour (±15 minutes) with or without agitation for completing the enzymatic reaction.

After the first enzymatic process of step 456, the tiger nut is then processed with additional enzymes. In step 458, a dry mix of enzyme PG500 in an amount equivalent to 5 wt. % (±1 wt. %) of tiger nut protein weight and Gluczyme AF6 in an amount equivalent to 0.5% (±0.1 wt. %) of tiger nut carbohydrate weight is prepared; the dry mixture is added to the food processor with the tiger nut and Kleistase E5 NC mixture; reverse osmosis (RO) water in an amount equivalent to 60 wt. % (±5 wt. %) of tiger nut is added to the food processor; the mixture is blended until the mixture is smooth like a cream, for example, with a particle size below 25µ; the temperature of the blended mixture is raised to 50° C. (±2° C.), and the enzyme reaction is allowed to continue with or without agitation for 1 hour (±15 minutes).

After the enzymatic steps, the tiger nut mixture goes through a texture enhancement process. In step 460, baking soda in an amount equivalent to 1.4 wt. % (±0.2 wt. %) of tiger nut is added to the mixture; dextrose, high fructose syrup, stabilizer water solution, and vanilla extract are then added to the tiger nut mixture.

In step 462, the mixture is pasteurized at 70° C. (±2° C.) for 15 minutes (±2 minutes).

In step 464, the processed tiger nut based substitute of ice cream is hot filled into the packaging container, cool down to ambient temperature, for example, around 22° C. to 25° C., and stored in at a temperature<25° C. In other embodiments, the cooling down may be assisted with the use of a chiller, refrigeration machine, or the like.

It is noted that the methods and/or processes illustrated with reference to FIGS. 1-4 are examples and do not limit the scope of the present teachings. Additional steps such as adjusting PH, for example, by using citric acid, may be desirable during the ingredient preparation and/or the food production.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What may be claimed is:

1. A method to prepare a food composition, comprising:
providing a nut from *Canarium;*
removing a flavor from the nut;
providing a whitening agent;
mixing the nut with the whitening agent;
providing an enzyme;
mixing the nut with the enzyme for an enzymatic reaction;

providing a texture-improving agent; and
mixing the nut with the texture-improving agent to form the food composition,
wherein the food composition does not contain animal milk, and wherein said removing a flavor from the nut comprises:
providing and mixing water and silicon dioxide to form a first mixture;
heating the first mixture;
mixing the first mixture with the nut to form a second mixture;
heating the second mixture;
providing baking soda;
mixing the baking soda with the second mixture to form a third mixture;
heating the third mixture; and
separating the nut from the third mixture.

2. The method of claim 1, wherein the food composition is a substitute for ice cream.

3. The method of claim 1, wherein said heating the third mixture further comprises heating the third mixture at 90° C. for 15 minutes.

4. The method of claim 1, wherein the enzyme comprises papain.

5. The method of claim 4, further comprising keeping the nut mixed with the enzyme at 65° C. for 2 hours for the enzymatic reaction.

6. The method of claim 1, wherein the texture-improving agent comprises baking soda.

7. The method of claim 6, further comprising keeping the nut mixed with texture-improving agent at a temperature same as the enzymatic reaction and with a duration same as the enzymatic reaction.

\* \* \* \* \*